(12) United States Patent
Vazquez Castro et al.

(10) Patent No.: US 10,196,124 B2
(45) Date of Patent: Feb. 5, 2019

(54) AIRCRAFT EXTERNAL PART WITH INFLATABLE PANELS

(71) Applicants: Airbus Operations S.L., Getafe (ES); Airbus Operations Ltd., Bristol (GB)

(72) Inventors: Jesús Javier Vazquez Castro, Getafe (ES); Fernando Pereira Mosqueira, Getafe (ES); Juan José Gutierrez Santiago, Getafe (ES); Anthony Langley, Bristol (GB); Guy Tothill, Bristol (GB); Davood Sarchamy, Bristol (GB); Miguel Marín Muñoz, Getafe (ES)

(73) Assignees: Airbus Operations S.L., Getafe (ES); Airbus Operations Ltd., Bristol (GB)

( * ) Notice: Subject to any disclaimer, the term of this patent is extended or adjusted under 35 U.S.C. 154(b) by 300 days.

(21) Appl. No.: 15/201,762

(22) Filed: Jul. 5, 2016

(65) Prior Publication Data

US 2017/0001703 A1    Jan. 5, 2017

(30) Foreign Application Priority Data

Jul. 3, 2015    (EP) ..................................... 15382356

(51) Int. Cl.
| | |
|---|---|
| *B64C 1/12* | (2006.01) |
| *B64C 1/34* | (2006.01) |
| *B64C 3/26* | (2006.01) |
| *B64C 7/02* | (2006.01) |
| *B64C 1/06* | (2006.01) |
| *B64C 7/00* | (2006.01) |

(52) U.S. Cl.
CPC ................ *B64C 1/12* (2013.01); *B64C 1/061* (2013.01); *B64C 1/064* (2013.01); *B64C 1/34* (2013.01); *B64C 3/26* (2013.01); *B64C 7/00* (2013.01); *B64C 7/02* (2013.01)

(58) Field of Classification Search
CPC ........... B64C 1/12; B64C 1/061; B64C 1/064; B64C 1/34; B64C 3/26; B64C 7/00; B64C 7/02
See application file for complete search history.

(56) References Cited

U.S. PATENT DOCUMENTS

| 2,743,510 A | | 5/1956 | Mauney et al. | |
|---|---|---|---|---|
| 3,447,768 A | * | 6/1969 | McQueen | B64D 37/04 244/135 R |
| 4,582,278 A | * | 4/1986 | Ferguson | B64C 3/46 244/219 |

(Continued)

FOREIGN PATENT DOCUMENTS

FR    2246444    5/1975

OTHER PUBLICATIONS

European Search Report, Dec. 8, 2015 priority document.

*Primary Examiner* — Justin M Benedik
(74) *Attorney, Agent, or Firm* — Greer, Burns & Crain, Ltd.

(57) ABSTRACT

An external part of an aircraft (such as a fairing) comprising a skin made with flexible materials attached to rigid supporting elements (such as longerons and frames) arranged in, at least, two directions. The skin comprises inner inflatable panels in all bays delimited by the rigid supporting elements and/or an external inflatable panel. The skin is joined to the supporting elements so that its external surface complies with aerodynamic requirements.

13 Claims, 3 Drawing Sheets

(56) References Cited

U.S. PATENT DOCUMENTS

| | | | | |
|---|---|---|---|---|
| 5,681,010 A | * | 10/1997 | Jensen | ............... B64C 1/34 |
| | | | | 244/100 A |
| 7,185,851 B2 | | 3/2007 | Elam | |
| 8,882,049 B2 | * | 11/2014 | Shams | ............... B64C 21/00 |
| | | | | 244/203 |
| 2005/0015100 A1 | | 1/2005 | Parodi | |
| 2006/0060706 A1 | * | 3/2006 | Elam | ............... B64C 3/30 |
| | | | | 244/128 |

* cited by examiner

AIRCRAFT EXTERNAL PART WITH INFLATABLE PANELS

CROSS-REFERENCES TO RELATED APPLICATIONS

This application claims the benefit of the European patent application No. 15382356.2 filed on Jul. 3, 2015, the entire disclosures of which are incorporated herein by way of reference.

FIELD OF THE INVENTION

The present invention relates to the structure of aircraft external parts undergoing, mainly, pressure loads such as fairings and, particularly, a belly fairing.

BACKGROUND OF THE INVENTION

The aircraft belly fairing stores equipment and systems located between the wing and the fuselage such as air conditioning equipment, fuel systems and the landing gear. The size and location of the landing gear bay is the main constraint for the ventral fairing design.

The main objective of the ventral fairing aerodynamic design is to minimize the negative interferences between the wing, the fuselage and the ventral fairing, in order to achieve the least aerodynamic drag penalty possible and to improve the airflow adherence conditions around the wing surface.

From a structural point of view, known belly fairings are formed by a rigid skin and an inner reinforcing structure comprising longerons and frames arranged in perpendicular directions. The skin is usually formed by several panels (particularly composite honeycomb panels) bolted or fastened to the longerons and frames.

This invention is addressed to an improvement of known belly fairings and similar external parts of aircraft in weight and drag reduction as well as in assembly and maintainability using inflatable structures.

The use of inflatable structures in aircraft is not new and some proposals for deployable structures and/or structures able to changes of shape are known, such as U.S. Pat. No. 5,681,010 that discloses a deployable, inflatable aerodynamic control structure for aerospace vehicles which has a desired non-circular or non-cylindrical cross-section, U.S. Pat. No. 7,185,851 B2 that discloses a wing that includes an array of inflatable chambers with generally circular cross-sections or US 2005/0151007 A1 that discloses an inflatable, rigidizable wing for a terrestrial or planetary flying vehicle that can be deployed from an initially packed condition to assume its functional shape by means of an inflation gas.

However inflatable structures will be used in the present invention in a very different way to these proposals.

SUMMARY OF THE INVENTION

The invention provides an aircraft external part of an aircraft (such as a fairing) comprising a skin made with flexible materials attached to rigid supporting elements (such as longerons and frames) arranged in, at least, two directions. The skin comprises inner inflatable panels in all bays delimited by the rigid supporting elements and/or an external continuous inflatable panel. The skin is joined to the supporting elements so that its external surface complies with aerodynamic requirements.

In an embodiment, the skin comprises a continuous external layer and inner inflatable panels made with a drop stitching technique to control that their shape fit the space of the bays and provide the required out of plane inertia, when they are inflated, for backing the continuous external layer.

In another embodiment, the skin comprises a continuous external layer and inner inflatable panels as an integral solution. Integration can be performed by bonding inner inflatable panels to the external continuous layer or using an external continuous skin as the panel external layer.

In another embodiment, the skin comprises an external inflatable panel and an internal backup formed by inner inflatable panels.

In another embodiment, the skin comprises an external inflatable panel and an internal backup formed by a lattice structure.

In another embodiment, the skin comprises an external inflatable panel and inner inflatable panels as an integral solution. Integration can be performed by bonding the external layer of inner inflatable panels to the internal layer of the external inflatable panel or using the internal layer of the external inflatable panel as the external layer of the inner inflatable panels.

Other characteristics and advantages of the present invention will be clear from the following detailed description of embodiments illustrative of its object in relation to the attached drawings.

BRIEF DESCRIPTION OF THE DRAWINGS

FIG. 1a is a schematic plan view of an embodiment of an aircraft external part according to this invention and FIG. 1b is a sectional view by the plane A-A of FIG. 1a.

DETAILED DESCRIPTION OF THE PREFERRED EMBODIMENTS

Figure 1A:
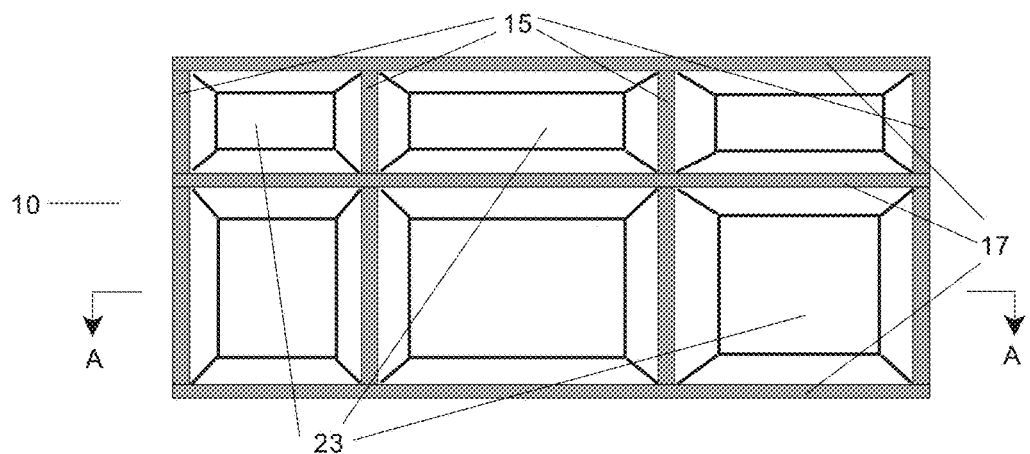
Figure 1B:
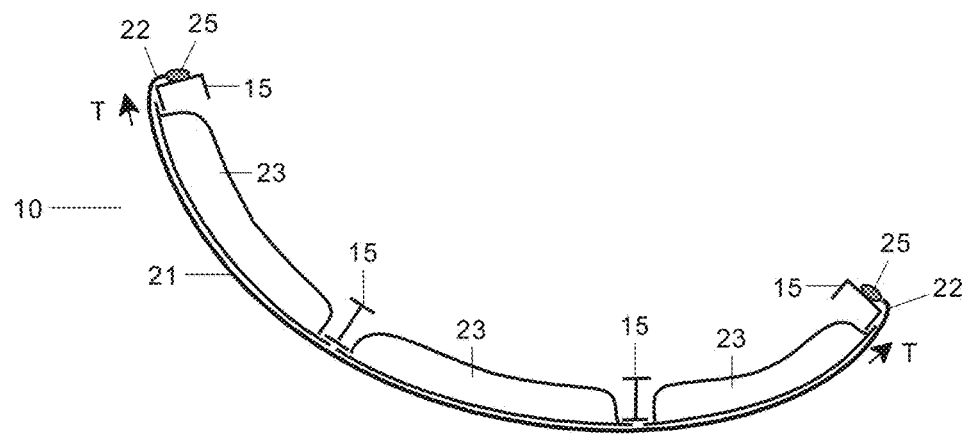
Figure 2A:
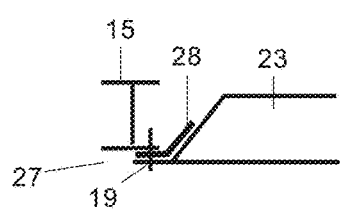
FIGS. 2a and 2b are schematic views of joining areas of the aircraft external part of FIGS. 1a-1b.
Figure 2B:
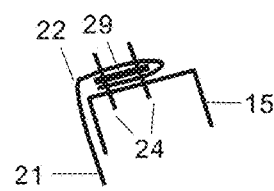

In a first embodiment (see FIGS. 1a-1b, 2a-2b), an aircraft external part 10, such as a belly fairing, comprises longerons 15 and frames 17 as rigid supporting elements made of metallic or composite materials in a similar way to known belly fairings, and a skin made of a flexible continuous external layer 21 and inner inflatable panels 23 in the bays delimited by the longerons 15 and the frames 17.

The inner inflatable panels 23 are always inflated when the aircraft external part 10 is mounted in the aircraft. They could be uninflated when the aircraft external part 10 is removed from the aircraft for maintenance purposes.

The continuous external layer 21 may be made, for instance, with a base fabric of aramide and a coating of CSM (Chlorosulfonated Polyethylene) or TPU (thermoplastic polyurethane).

Figure 3:
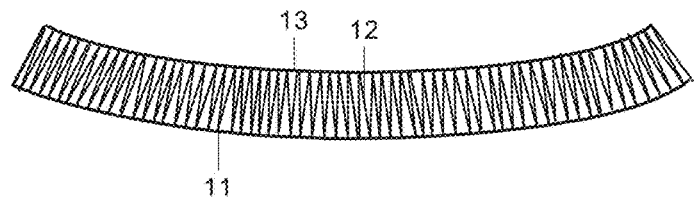
FIG. 3 is a schematic sectional view of an inflatable panel used in embodiments of this invention.

The inner inflatable panels 23 are made using a drop stitching technique, i.e., they are made (see FIG. 3) with two plies 11, 13 of a similar material as the continuous external layer 21, joined together by a plurality of substantial inextensible elements 12 to restrict the extent of separability of the plies 11, 13. A general description of the technique can be found in U.S. Pat. No. 2,743,510.

The drop stitching technique allows controlling the configuration of the inner inflatable panels 23 when they are inflated to comply with two main requirements:

Having a controlled curved shape so that they can adapt to the shape of the aircraft external part 10.

Providing out of plane inertia for backing the continuous external layer 21.

The inner inflatable panels 23 are joined to the longerons 15 and frames 17 by suitable joining means 27 (see FIG. 2a) including a rigid plate 28 providing a rigid-rigid connection to a fastening means 19.

The continuous external layer 21 is joined to the two outer longerons 15 by joining devices 25 that include means for applying a pretension T to the continuous external layer 21 to keep the required shape together with the backing provided by the inner inflatable panels 23. The ends 22 of the continuous external layer 21 are configured with a rigid plate 29 disposed within a fold providing a rigid-rigid connection to the fastening means 24.

Figure 4:
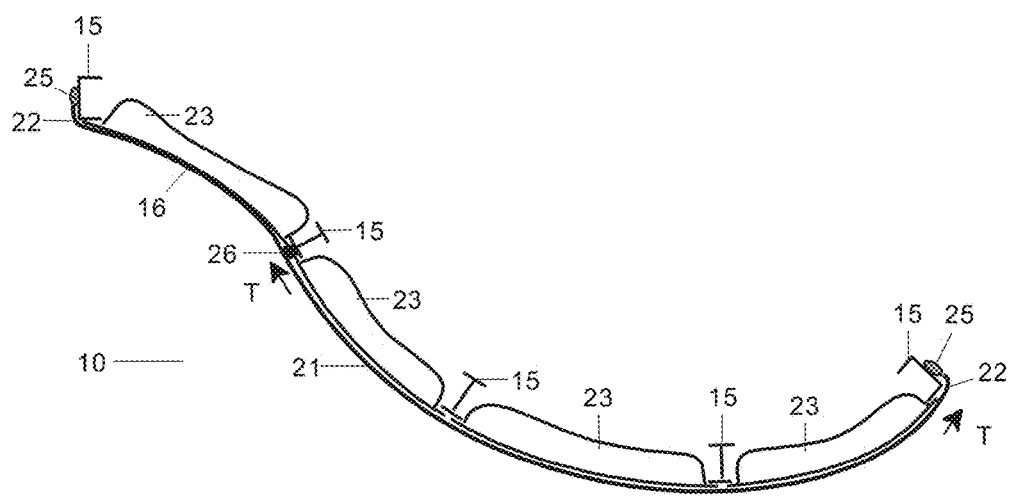
FIGS. 4-8 are schematic sections views of five embodiments of an aircraft external part according to this invention.

If the aircraft external part 10 has convex and concave areas (see FIG. 4), the continuous external layer 21 shall be also joined to an intermediate longeron 15 between a concave and a convex area through suitable joining means 26 including means for applying a pretension T. In the non-convex area 16 (seen from the outside of the aircraft external part 10), the continuous external layer 21 shall be bonded to the contiguous inflatable panel 23 to be pretensioned by it.

Figure 5:
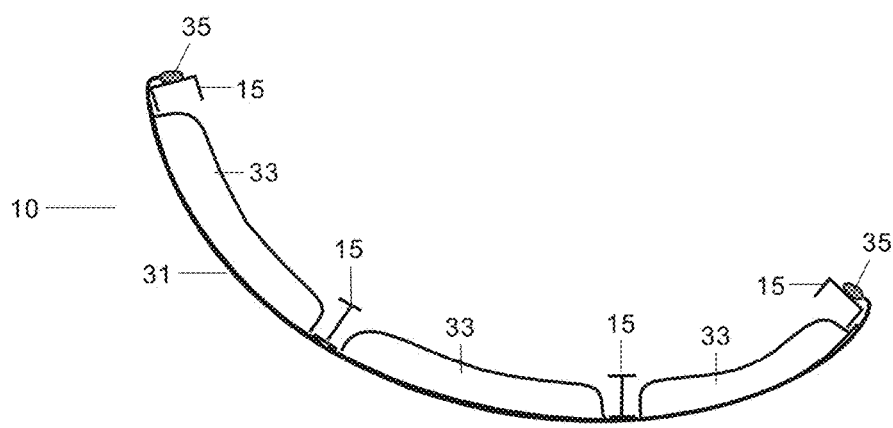

In a second embodiment (see FIG. 5), the skin is a single piece comprising an external continuous layer 31 joined to the two outer longerons 15 by joining devices 35 and inner inflatable panels 33 integrated into the external continuous layer 31.

Figure 6:
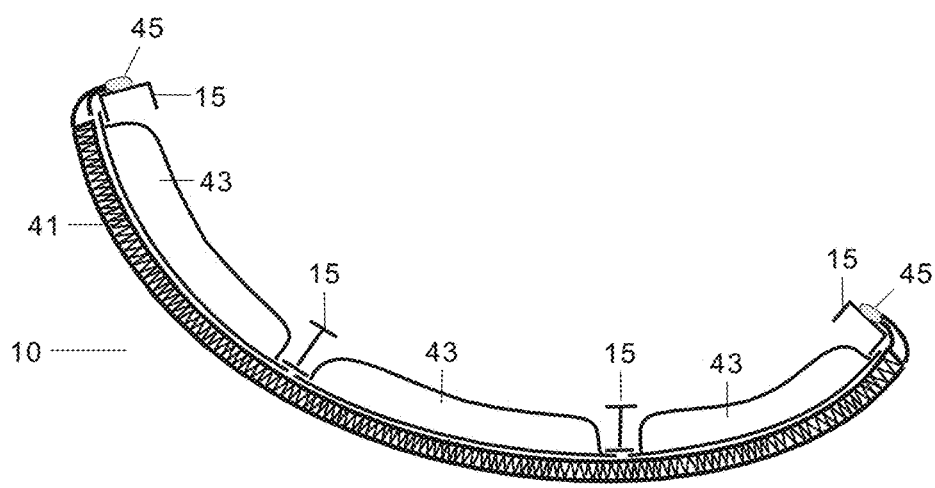
Figure 7:
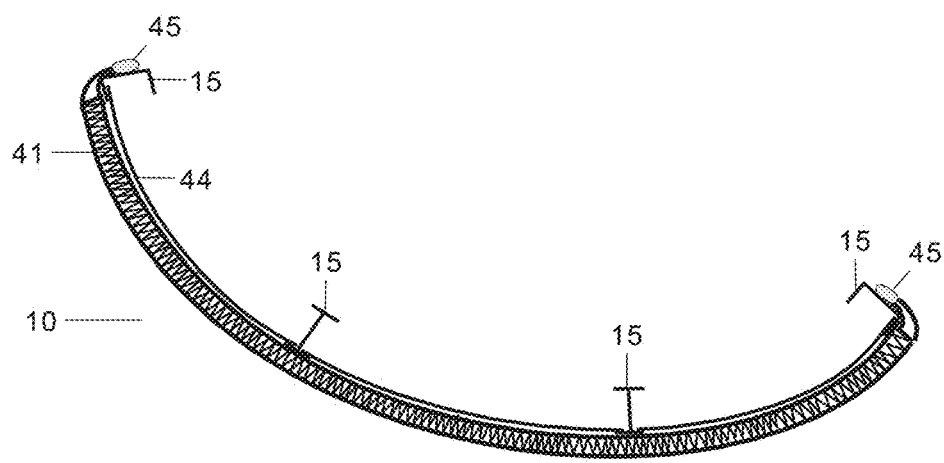

In a third embodiment (see FIGS. 6-7), the skin comprises an external inflatable panel 41 joined to the two outer longerons 15 by joining devices 45 and an internal backup formed by inner inflatable panels 43 in the bays delimited by the longerons 15 and the frames 17 (see FIG. 6), joined to them by suitable joining means (similar to those shown in FIG. 2a for joining the inner inflatable panels 23 to the longerons 15) or a lattice structure 44 (see FIG. 7) that can be formed, for instance, by a triangular meshing adapted to the curved shape of the aircraft external part 10. The external inflatable panel 41 is pretensioned when it is inflated. The external inflatable panel 41 and the inner inflatable panels 43 are preferably made using a drop stitching technique.

Figure 8:
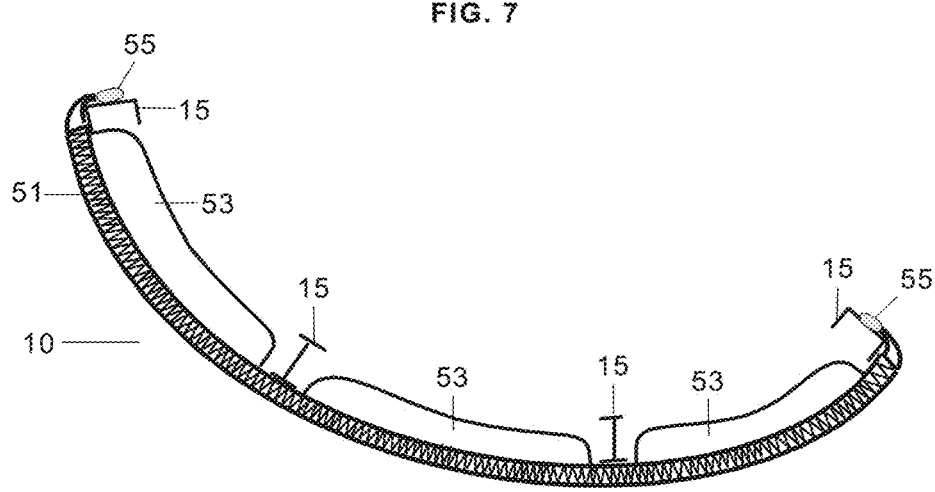

In a fourth embodiment (see FIG. 8), the skin is a single piece comprising an external inflatable panel 51 joined to the two outer longerons 15 by joining devices 55 and inner inflatable panels 53 integrated into the external inflatable panel 51.

The main advantages of the fairings of the invention with respect to known fairings are:

Weight and cost savings.

Better assembly and maintainability as they can be easily managed in uninflated state.

Drag reduction due to the replacement of several honeycomb panels by one continuous skin.

Although the present invention has been described in connection with various embodiments, it will be appreciated from the specification that various combinations of elements, variations or improvements therein may be made, and are within the scope of the invention as defined by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft external part comprising:
a skin and
inner supporting elements made with a rigid material and arranged in, at least, two directions, wherein:
the skin is made of a flexible material and comprises inner inflatable panels in all bays delimited by the inner supporting elements;
the skin is joined to the inner supporting elements so that its external surface complies with aerodynamic requirements.

2. The aircraft external part according to claim 1, wherein:
the skin comprises a continuous external layer and e inner inflatable panels made with a drop stitching technique to control that their shape fit the space of the bays and provide the required out of plane inertia, when they are inflated, for backing the continuous external layer;
the ends of the continuous external layer are joined to two inner supporting elements by suitable joining devices that allow applying a pretension to the continuous external layer for complying with aerodynamic requirements;
the inner inflatable panels are joined to the inner supporting elements by suitable joining means.

3. The aircraft external part according to claim 2, wherein the ends of the continuous external layer are configured with a rigid plate disposed within a fold of the continuous external layer for cooperating with fastening means of said joining devices.

4. The aircraft external part according to claim 2, further comprising concave and convex areas, the continuous external layer also being joined by suitable joining means to intermediate inner supporting elements located in transition zones between a concave and a convex area.

5. The aircraft external part according to claim 1, wherein the skin is a single piece comprising an external continuous layer joined to two supporting elements by suitable joining devices and inner inflatable panels integrated into the external continuous layer.

6. The aircraft external part according to claim 1, wherein the skin comprises an external inflatable panel joined to two inner supporting elements by suitable joining devices and an internal backup.

7. The aircraft external part according to claim 6, wherein the internal backup is formed by the inner inflatable panels in all bays delimited by the inner supporting elements joined to the inner supporting elements.

8. The aircraft external part according to claim 6, wherein the internal backup is a lattice structure joined to the inner supporting elements.

9. The aircraft external part according to claim 1, wherein the skin is formed by an inflatable structure comprising an external inflatable panel joined to two inner supporting elements and the inner inflatable panels in all bays delimited by the inner supporting elements bonded to the external inflatable panel.

10. The aircraft external part according to claim 1, comprising an aircraft fairing.

11. The aircraft external part according to claim 10, the aircraft fairing comprising an aircraft belly fairing.

12. The aircraft external part according to claim 11, wherein the inner supporting elements comprise longerons and frames.

13. The aircraft external part wherein the skin further comprises an external inflatable panel.

\* \* \* \* \*